(12) United States Patent
Barnes et al.

(10) Patent No.: US 6,667,370 B1
(45) Date of Patent: Dec. 23, 2003

(54) METHOD FOR PRODUCING PREPOLYMERS CONTAINING ISOCYANATE END GROUPS, INCORPORATING A SMALL PROPORTION OF BASE ISOCYANATES

(75) Inventors: James-Michael Barnes, Breitscheid (DE); Manfred Schmidt, Dormagen (DE); Stefan Wershofen, Mönchengladbach (DE); Andreas Hoffmann, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/049,926

(22) PCT Filed: Aug. 11, 2000

(86) PCT No.: PCT/EP00/07823

§ 371 (c)(1),
(2), (4) Date: Feb. 20, 2002

(87) PCT Pub. No.: WO01/14443

PCT Pub. Date: Mar. 1, 2001

(30) Foreign Application Priority Data

Aug. 23, 1999 (DE) .......................................... 199 39 840

(51) Int. Cl.[7] .............................................. C08G 18/10
(52) U.S. Cl. ........................... 525/440; 528/59; 528/60; 528/83
(58) Field of Search ........................... 525/440; 528/59, 528/83, 60

(56) References Cited

U.S. PATENT DOCUMENTS

| 4,543,405 A | | 9/1985 | Ambrose et al. ............. 528/78 |
| 4,568,717 A | | 2/1986 | Speranza et al. ........... 524/762 |
| 4,786,703 A | * | 11/1988 | Starner ........................ 528/63 |
| 5,373,029 A | * | 12/1994 | Naujoks ..................... 521/172 |

FOREIGN PATENT DOCUMENTS

| DE | 19 601 410 | 7/1997 |
| EP | 579 988 | 1/1994 |

* cited by examiner

Primary Examiner—Patricia A. Short
(74) Attorney, Agent, or Firm—Joseph C. Gil; Lyndanne M. Whalen

(57) ABSTRACT

This invention relates to a process for producing prepolymers, which contain isocyanate terminal groups and which have a very low content of free isocyanate starting materials, from polyester polyols and polyisocyanates.

5 Claims, No Drawings

METHOD FOR PRODUCING PREPOLYMERS CONTAINING ISOCYANATE END GROUPS, INCORPORATING A SMALL PROPORTION OF BASE ISOCYANATES

This invention relates to a process for producing prepolymers, which contain isocyanate terminal groups and which have a very low content of free isocyanate starting materials, from polyester polyols and polyisocyanates.

Prepolymers which contain isocyanate terminal groups and which are formed from polyisocyanates and polyesters which contain hydroxy groups are produced and used industrially on a large scale for very different purposes, e.g. for the production of cast PU elastomers.

For environmental reasons it is desirable to produce prepolymers which contain isocyanate groups and which only have a low content of unreacted polyisocyanates. This is all the more desirable since these prepolymers are often processed further at elevated temperatures to form final products, whereupon unreacted isocyanate starting materials can volatilise. Due to the toxicity of the polyisocyanates used, particular safety precautions are then necessary during the processing of the prepolymers, which increases the cost of processing prepolymers such as these to form the final products thereof.

According to the prior art, prepolymers such as these are sometimes produced by separating the prepolymers from unreacted isocyanate by distillation under vacuum after the reaction of the monomeric isocyanate starting material with the polyol. When polyester prepolymers are employed, however, significant amounts of isocyanate still remain in the prepolymer, even after distillation.

The object of the present invention is therefore to produce prepolymers which contain isocyanate terminal groups and which have a reduced content of monomeric isocyanate starting material compared with the prior art.

Surprisingly, it has now been found that prepolymers such as these can be produced by very substantially freeing the polyester polyols, before they are used, from free polyester components of low molecular weight which contain hydroxyl groups, such as diols and triols, and thus achieving a defined content of low molecular weight components in the polyols to be used.

The present invention therefore relates to a process for producing prepolymers which contain isocyanate terminal groups, which is characterised in that polyisocyanates in excess are reacted with a polyester which contains at least two hydroxy groups, of molecular weight 400 to 5000, wherein the polyester used has a content of polyols on which the polyesters are based of $\leq 6$ mol %, preferably $\leq 3$ mol % and most preferably $\leq 1.5$ mol % with respect to the molar distribution of the polyester, and the reaction mixture is subsequently subjected to distillation, optionally with the addition of an entraining agent.

The polyesters which are preferably used in the process according to the invention have a theoretical content of 2 to 4 hydroxyl groups and a molecular weight of 400 to 5000, particularly 600 to 2500, and have a content of polyols (glycol components) on which the polyesters are based of $\leq 6$ mol %, preferably $\leq 3$ mol % most preferably $\leq 1.5$ mol %.

According to the invention, the polyisocyanates are used in an equivalent ratio to the polyesters of at least 1.9:1, preferably from 2:1 to 20:1, most preferably from 2.2:1 to 10:1.

The content according to the invention of polyols on which the polyesters are based can be achieved according to the prior art by various routes, for example by flash evaporation or thin film distillation, whereupon after distillation the polyesters are quenched very rapidly, by intensive cooling, to a temperature less than 140° C., preferably less than 100° C., most preferably less than 70° C., so as to prevent the establishment of an equilibrium comprising the presence of monomeric components. Corresponding methods are described in EP 0579988.

All known aliphatic, cycloaliphatic, araliphatic, aromatic and/or heterocyclic polyisocyanates can be used as polyisocyanates in the process according to the invention, such as those described, for example, by W. Siefken in Justus Liebigs Annalen der Chemie, 562, pages 75 to 136, with the proviso that it must be possible to distil these polyisocyanates under vacuum without decomposition. In general, polyisocyanates which are readily available industrially are most preferably used, such as toluene 2,4- and/or 2,6-diisocyanate (TDI).

The aforementioned polyesters which contain at least two hydroxy groups and which have molecular weights ranging from 400 to 5000 can be used as polyesters in the process according to the invention. Polyesters such as these, which contain hydroxy groups, are known for the production of homogeneous and cellular polyurethanes, and are described in DE-A 28 32 253 for example.

Polyesters which are particularly suitable are those which can be synthesised from commercially available diols and/or triols, which preferably contain 2 to 6 carbon atoms, as the polyol component, such as ethylene glycol, diethylene glycol, propanediol, butanediol or hexanediol, wherein the carbon chain can also contain oxygen bridges such as that in diethylene glycol, and from customary dicarboxylic acids, preferably adipic acid, or industrial mixtures thereof with succinic and/or glutaric acid, as the polycarboxylic acid component.

The polyesters which are used can be modified according to the prior art, or can incorporate additives such as plasticisers, emulsifiers or catalysts.

After the reaction of the polyisocyanates which are used with the polyesters which are used according to the invention, the reaction mixture is distilled, optionally with the addition of an entraining agent.

Distillation is usually conducted at temperatures within the range from about 130° to 220°, at pressures which range from about 0.001 bar to 1 bar.

Entraining agents which are known for purposes such as this, for example toluene, can be used as entraining agents.

The most favourable amount of entraining agent to use can easily be determined by appropriate preliminary tests, and usually ranges from 2 to 5% by weight with respect to the amount of prepolymers.

Prepolymers which contain isocyanate terminal groups, which are produced by the process according to the invention and which have a very low content of isocyanate starting materials, can be further processed in the usual manner according to the prior art for the production of polyurethane plastics (using corresponding polyol synthesis components).

EXAMPLE

1.1 Production and Modification of Polyesters

The polyesters used were in all cases those which were synthesised from ethylene glycol and adipic acid only. They were produced in the manner known in the art by heating the two starting materials to about 200° C. under a vacuum of up to 15 mbar, with the water of reaction being taken off simultaneously. The end point of the esterification was reached when the acid number of the reaction mixture had fallen below 1.

In order to remove components of low molecular weight after esterification, the polyesters were freed from volatile components of low molecular weight in a flash evaporator at temperatures of 200° C. and pressures of <0.2 mbar. This short-term treatment substantially prevented the formation of short-chain species by transesterification reactions in the polyester. Therefore, the polyesters were no longer in a statistical equilibrium.

Two polyesters with different molecular weights were produced. The analytical data obtained for these esters before and after flash distillation are given in the following Table:

| | Before distillation: | | | | After distillation: | | | |
|---|---|---|---|---|---|---|---|---|
| Ex. | AN | OHN | Mn | Fr. gly | AN | OHN | Mn | Fr. gly |
| 1a | 0.6 | 64.2 | 1750 | 0.4 | 0.5 | 56.7 | 1980 | <0.02 |
| 2a | 0.9 | 54.5 | 2060 | 0.2 | 0.98 | 49.0 | 2290 | <0.02 |

AN = acid number (mg KOH/g), OHN = hydroxyl number (mg KOH/g), Mn = number average molecular weight, Fr. gly = free glycol in % by weight.

Comparative Example

A Commercially Available Polyester without Distillation of the Short-chain Constituents Desmophen® 2000 MZ: AN: 0.9 OHN: 56 Mn: 2000 Fr. gly: 0.2

Desmophene® 2000 MZ is a polyester formed from adipic acid and ethylene glycol (a commercial product of Bayer AG)

1.2 Production of Polyester-TDI Prepolymers with a Low Monomer Content

In order to produce polyester-TDI prepolymers with a low monomer content, the polyesters obtained as in 1.1 were reacted in a molar ratio of 1 to 8 with TDI 80 (=a mixture of isomers comprising 80% 2.4- and 20% 2.6-TDI) and were subsequently freed from excess TDI in a flash evaporator.

The prepolymers were characterised by the following analytical data:

| Ex. | PE* | NCO (theor.) (%) | free TDI (% by GC) | NCO (found) (%) | Viscosity (70° C.) (mPas) |
|---|---|---|---|---|---|
| 1b | 1a | 3.6 | <0.03 | 3.5 | 3150 |
| 2b | 2a | 3.2 | <0.03 | 3.2 | 4540 |

Data given as percentages by weight
*PE = polyester from Example 1.1 after distillation Comparison For comparison, a prepolymer was produced analogously to 1.2 from the commercially available polyester Desmophen® 2000 MZ manufactured by Bayer AG. The following analytical data were obtained for this prepolymer:

| NCO (theor.) (%) | free TDI (% determined by GC) | NCO (found) (%) | Viscosity (mPas) (mPas) |
|---|---|---|---|
| 3.65 | 16 | 3.4 | 3380 |

Percentages given as percentages by weight 1.3. Production of Elastomers from the Prepolymers Described in 1.2

The prepolymers described in 1.2 were reacted in the usual manner at 100° C. with a crosslinking agent comprising the isobutyl ester of 4-chloro-3,5-diaminobenzoic acid to form an elastomer and were cast into moulds (20×20×2(6, 12.5) mm). The castings were subsequently annealed for 24 hours at 110° C., and after 14 days the properties listed in the following Table were measured:

TABLE

| Prepolymer | 1b | 2b | Comparison | Measured according to DIN |
|---|---|---|---|---|
| Stoichiometric ratio of prepolymer to crosslinking agent | 1.1:1 | 1.1:1 | 1.1:1 | |
| Shore hardness A/D | 92/32 | 90/30 | 91/32 | 53505 |
| Tensile strength (Mpa) | 50 | 49 | 40 | 53504 |
| Impact resilience (%) | 41 | 45 | 40 | 53512 |
| Tear propagation resistance (kN/m) | 49 | 45 | 45 | 53515 |
| Abrasion loss (mm$^3$) | 46 | 43 | 40 | 53516 |

Results

It can be seen from the Table of prepolymers that the commercially available products have a considerably higher content of free TDI than do the products according to the invention, in which the free TDI was less than the limits of detection of the methods used.

It can be seen from the Table of elastomers that the mechanical properties of the elastomers were not affected by the pretreatment according to the invention of the polyesters.

What is claimed is:
1. A process for the production of a prepolymer containing terminal isocyanate groups comprising a) reacting
1) an excess of polyisocyanate with
2) a polyester having at least two hydroxy groups and a molecular weight of from 400 to 5,000 in which the polyol content is no greater than 6 mol % of the total moles of polyester and b) distilling the reaction product of a), optionally with the addition of an entraining agent.

2. The process of claim 1 in which the polyester has a polyol content no greater than 3 mol %.

3. The process of claim 1 in which the polyester has a polyol content no greater than 1.5 mol %.

4. The process of claim 1 in which the polyisocyanate and polyester are reacted in amounts such that the equivalent ratio of polyisocyanate to polyester is at least 1.9:1.

5. A process for the production of a cast polyurethane elastomer comprising a) reacting an excess of polyisocyanate with a polyester having at least two hydroxy groups and a molecular weight of from 400 to 5,000 in which the polyol content is no greater than 6 mol % of the total moles of polyester, b) distilling the reaction product of a), optionally with the addition of an entraining agent, and c) reacting the product of b) with a crosslinking agent.

* * * * *